United States Patent

Nihei et al.

[11] Patent Number: 5,570,187
[45] Date of Patent: Oct. 29, 1996

[54] WELD-POSITION DETECTOR PROVIDED WITH AN OPTICAL AXIS ADJUSTMENT MEANS AND USED WITH A ROBOT WELDING MACHINE

[75] Inventors: Ryo Nihei, Fujiyoshida; Yasuo Sasaki; Takahiro Hase, both of Yamanashi, all of Japan

[73] Assignee: Fanuc Ltd, Yamanashi, Japan

[21] Appl. No.: 603,181

[22] Filed: Feb. 20, 1996

Related U.S. Application Data

[63] Continuation of Ser. No. 329,168, Oct. 26, 1994, abandoned.

[30] Foreign Application Priority Data

Oct. 26, 1993 [JP] Japan .................... 5-267326

[51] Int. Cl.$^6$ .................................................. G01B 11/24
[52] U.S. Cl. ............................................................ 356/376
[58] Field of Search .................................... 356/376, 375, 356/372, 138, 153, 399, 400; 250/234–236, 559.23, 559.29, 599.38, 559.22; 359/214, 217; 219/124.34, 121.28, 121.29, 121.6, 121.78, 121.79

[56] References Cited

U.S. PATENT DOCUMENTS

4,171,902  10/1979  Imai et al. ........................ 356/138
4,758,093  7/1988  Stern et al. ........................ 356/376
5,337,148  8/1994  Torii et al. ........................ 356/376

*Primary Examiner*—Hoa Q. Pham
*Attorney, Agent, or Firm*—Nikaido Marmelstein Murray & Oram LLP

[57] ABSTRACT

A weld-position detector, attached to an automatic welding machine such as a welding robot, having three independently produced indispensable units, i.e., a laser-beam projecting unit for projecting a detection laser-beam, a scanning unit for directing the detection laser-beam towards weld portions of a workpiece and scanning the detection laser-beam across the welded portions, and a light-receiving unit for detecting the detection laser-beam reflected by the workpiece to thereby detect the position of the weld portions. The weld-position detector further having a fixture provided with reference faces on which the three independent units are accurately mounted. The scanning means having a movable reflecting mirror is provided with an optical axis adjusting unit for adjusting the position and the posture of the scanning unit so as to adjust the optical axis of the detection laser-beam until the optical axis of the detection laser-beam, after being reflected from the workpiece, arrives at the light-receiving unit.

4 Claims, 6 Drawing Sheets

WELD-POSITION DETECTOR PROVIDED WITH AN OPTICAL AXIS ADJUSTMENT MEANS AND USED WITH A ROBOT WELDING MACHINE

This application is a continuation of application Ser. No. 08/329,168 filed Oct. 26, 1994, now abandoned.

BACKGROUND OF THE INVENTION

1. Field of the Invention

The present invention relates to a weld-position detector used with an automatic welding machine, e.g., a robot welding machine having an end-effector on which a welding torch is mounted. More particularly, the present invention relates to a weld-position detector, for detecting a weld-position with high accuracy using a laser beam, provided with an optical axis adjustment means for adjusting the optical axis of the laser beam.

2. Description of the Related Art

It is known to use a robot welding machine, such as a arc-welding position multi-articulated welding robot, for automatically welding a workpiece. When a multi-articulated welding robot is used for carrying out automatic welding of a workpiece according to a predetermined welding program stored in a robot control unit, the distal end of a welding torch on the welding robot must be continuously brought into alignment with the portion of the workpiece where the weld should be applied. Thus, the welding robot is always provided with a weld-position detector for detecting the position on the workpiece where the welding is to be implemented by the welding torch in advance of the application of the welding arc. The weld-position detector is attached to the end-effector of the welding robot in combination with the welding torch and sends detection signals, as feedback signals, to a robot control unit which corrects a misalignment of the end of the welding torch, from the weld position determined by the welding program, in response to the feedback signals. The weld-position detector includes a semiconductor laser unit for emitting a detection laser-beam, a reflecting mirror unit for reflecting the detection laser-beam, a galvanometer unit (a drive unit) for moving the reflecting mirror so as to permit the detection laser-beam to scan portions of the workpiece, a light-receiving unit for receiving the detection laser-beam reflected from portions of the workpiece and to focus the detection laser-beam onto a charge-coupled image sensor to thereby form an image of the scanned portion of the workpiece, the light-receiving unit further providing two-dimensional data of the scanned portions of the workpiece from the data in the image on the charge-coupled image sensor and information on the angle of the reflecting mirror. At this stage, the charge-coupled image sensor incorporated in the light-receiving unit of the conventional welded position detector consists of a single-dimension CCD device (i.e., a line CCD sensor) which has a plurality of array elements and is 10 through 20μ meters wide. Therefore, when the detection laser-beam scans the workpiece in response to the movement of the reflecting mirror driven by the galvanometer, it is necessary that the scanning plane in which the detection laser-beam carries out the scanning motion due to the movement of the mirror is in alignment with a reflecting plane in which the detection laser-beam, after being reflected from the workpiece, moves along the charge-coupled image sensor. Namely, an exact alignment of the scanning plane of the detection laser-beam and the line CCD sensor is needed. Thus, the conventional weld-position detector must be finely adjusted to establish the above-mentioned alignment of the scanning plane of the detection laser-beam and the line CCD sensor by separately and delicately adjusting the positions of respective units and components on a fixture, or in the housing of the weld-position detector, during assembly of the respective units and components into the weld-position detector or after assembly of the weld-position detector.

Nevertheless, it is very difficult for an operator to accomplish the above-described alignment of the scanning plane of the detection laser-beam and the Line CCD sensor by finely adjusting the mounting positions of the respective units and components of the weld-position detector. Further, the difficulty in adjusting the mounting positions of the units and components makes the assembly and maintenance of the welded position detector cumbersome, and consequently, there was a limit to the performance of the weld-position detector. Namely, the conventional weld-position detector is not sufficiently accurate. Therefore, an improvement in the construction of the weld-position detector has been required.

SUMMARY OF THE INVENTION

Therefore, an object of the present invention is to provide a weld-position detector, used with an automatic welding machine such as a multi-articulated welding robot, in which adjustment of the scanning plane of the detection laser-beam and the line CCD sensor can be easily accomplished.

Another object of the present invention is to provide a novel weld-position detector, for accurately detecting welded-positions of a workpiece, which is provided with an optical axis adjusting means by which the adjustment of alignment of the scanning and light-receiving planes of the detection laser-beam can be easily and accurately achieved during assembling as well as during maintenance of the weld-position detector.

In order to achieve the above-mentioned objects, the present invention provides a weld-position detector for a robot welding machine, which includes a laser-beam projecting unit for projecting a detection laser-beam, a scanning unit for scanning the detection laser-beam across a workpiece upon being projected by the laser-beam projecting unit, and a light-receiving unit for receiving and detecting the detection laser-beam reflecting from welded portions of the workpiece, the respective units being preliminarily constructed as single independent units so that each unit has a predetermined production accuracy. The respective units are mounted on a fixture provided in the weld-position detector at predetermined mounting positions in predetermined mounting postures, and at least one of them, i.e., the laser-beam projecting, scanning or light-receiving unit is provided with adjusting means for adjusting the position and posture thereof against the fixture to thereby adjust the scanning plane of the detection laser-beam.

More specifically, in accordance with the present invention, there is provided a weld-position detector, for a robot welding machine, which includes a laser-beam projecting unit for projecting a detection laser-beam, a scanning unit for directing the detection laser-beam projected by the laser-beam projecting unit toward the weld portions of a workpiece and providing the detection laser-beam with a scanning motion across the weld portions of the workpiece upon being projected by the laser-beam projecting unit, and a light-receiving unit for receiving and detecting the detection laser-beam reflecting from welded portions of the workpiece. The weld-position detector is characterized in that the respective laser-beam projecting, scanning, and light-receiving units are beforehand produced as single independent units, that the weld-position detector further includes a fixture on which the three units are accurately mounted at respective predetermined positions, and that only one of the three units is provided with an optical axis adjusting means for adjusting the position and posture thereof with respect to a predetermined position on the fixture to thereby make alignment of the scanning plane of the detection laser-beam with a predetermined plane through the light-receiving unit.

Since the above-mentioned three independent units, i.e., the laser-beam projecting unit, the scanning unit, and the light-receiving unit, can be separately produced beforehand as highly accurate components of the weld-position detector, and since the fixture on which these three units are mounted can be formed with respective predetermined positions provided as reference mounting positions, the three units can be accurately mounted on the fixture. Thus, after mounting, only one of the three units, preferably, the scanning unit provided with a movable (rotary) reflecting mirror and a galvanometer driving the mirror, can be subjected to a fine adjustment of the mounting position on the fixture by using the optical axis adjusting means until the detection laser-beam, scanning across the welded portions of the workpiece, reflects from the workpiece and is accurately received by the light-receiving unit. Therefore, accurate detection of a weld portion of the workpiece can be achieved and, accordingly, accurate welding of the workpiece can be obtained.

It should be appreciated that since the abovementioned fine adjustment of the scanning plane of the detection laser-beam can be carried out, without any subsidiary tool, at the usual location of the robot welding machine, maintenance operations on the weld-position detector can be easily and simply performed.

Preferably, the scanning unit provided with the movable or rotary reflecting mirror and the galvanometer is mounted on the fixture by spring-loaded screws threadedly engaging in threaded holes in the fixture, and the optical axis adjusting means comprises three screws threadedly engaging in three holes formed at three separate positions of the scanning unit, and having a point, respectively, capable of abutting against the fixture to thereby adjustably move the scanning unit with respect to the fixture.

BRIEF DESCRIPTION OF THE DRAWINGS

The above and other objects, features and advantages of the present invention will be made more apparent from the ensuing description of a preferred embodiment thereof, in conjunction with the accompanying drawings wherein.

DESCRIPTION OF THE PREFERRED EMBODIMENT

Figure 1:
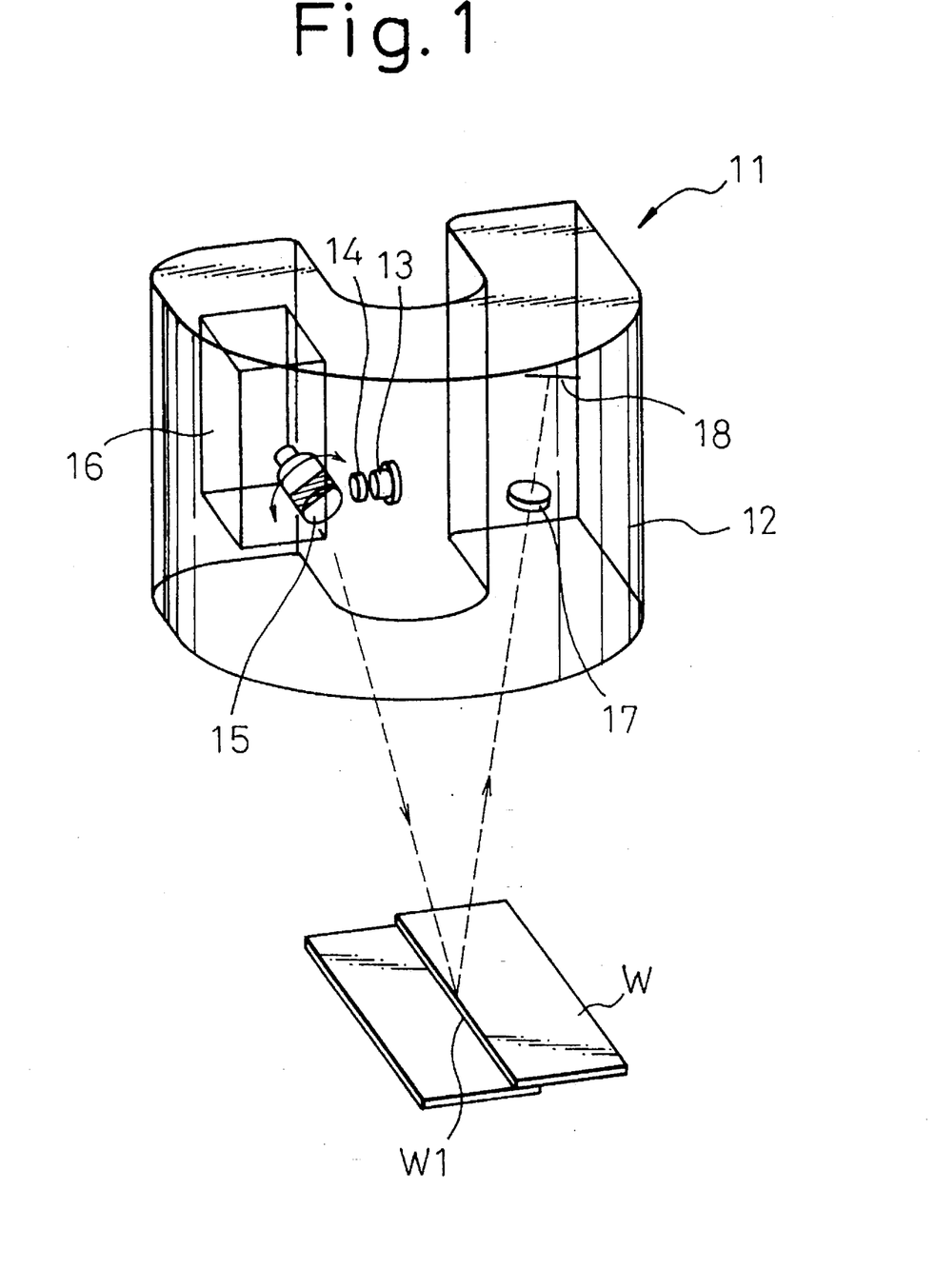
FIG. 1 is a perspective view of a weld-position detector according to both the prior art and the present invention, illustrating indispensable components of the detector.

Referring to FIG. 1, a weld-position detector 11, suitable for being attached to an end-effector of a robot welding machine such as a multi-articulated welding robot, is provided for detecting a weld portion "W1" at which, for example, a pair of metallic plates, i.e., a workpiece W are welded by a welding torch (not shown) of the robot welding machine.

The weld-position detector 11 is provided with a body element 12 by which the weld-position detector 11 is attached to the end-effector of the robot welding machine. The body 12 of the weld-position detector 11 receives therein a laser-beam projecting unit 13 consisting of a semiconductor laser projecting a detection laser-beam via a projecting lens 14 toward a movable or rotary reflecting mirror 15 in a scanning unit. The detection laser-beam is reflected by the rotary reflecting mirror 15.

The scanning unit is further provided with a galvanometer 16 for providing the reflecting mirror 15 with a controlled movement about the axis of rotation of the mirror 15 to thereby direct the detection laser-beam toward the workpiece W and scan the detection laser-beam across the weld portion W1. The detection laser-beam is reflected from the surface of the workpiece W, and is directed toward a line CCD sensor 18, via a light-receiving lens 17 in the body 12, whereby the weld portion W1 of the workpiece W is detected. Namely, the weld-position detector 11 is provided with three indispensable components, i.e., the laser-beam projecting unit 13, the scanning unit ( the movable reflecting mirror 15 and the galvanometer 16) for moving the detection laser-beam with a scanning motion, and the light-receiving unit (the light-receiving unit 17 and the charge-coupled image sensor 18).

The weld-position detector of the prior art and that according to the present invention are commonly provided with the above-mentioned three indispensable components. Nevertheless, in the weld-position detector of the prior art, the three indispensable components are not beforehand produced as independent units suitable for being accurately assembled in the body 12. Namely, the body 12 has no particular reference position for mounting thereon each of the three indispensable components, and accordingly, the mutual positional relationship of the three indispensable units must be adjusted so as to finally correct the optical axis of the detection laser-beam before and after reflecting from the workpiece W to thereby detect the correct position of the weld portion W1 of the workpiece W. Thus, the adjustment of the respective positions of the three indispensable components was very difficult and cumbersome.

The present invention was made so as to obviate the above-mentioned defect of the weld-position detector of the prior art.

Referring to FIGS. 2 through 5, a weld-position detector 20 according to an embodiment of the present invention is provided with a fixture 22 covered with a suitable covering (not shown). The fixture 22 is provided with an appropriate mounting bore 23 by which the detector 20 is attached to the robot welding machine in a manner similar to the prior art detector.

The fixture 22 of the weld-position detector 20 has an interior chamber therein in which the afore-mentioned three indispensable components in the form of three independent units produced beforehand are assembled.

The three independent units are a laser-beam projecting unit 30 projecting a detection laser-beam, a scanning unit 40 for the detection laser-beam, and a light-receiving unit 50 having therein a charge-coupled image sensor, and these three independent units 30, 40 and 50 are mounted on predetermined mounting positions formed in the outer faces of the fixture 22. Namely, the laser-beam projecting unit 30 and the light-receiving unit 50 which have no movable elements therein, are mounted on the fixture 22 so as to be abutted against predetermined mounting face 24 and firmly fixed by screws 25.

Figure 5:
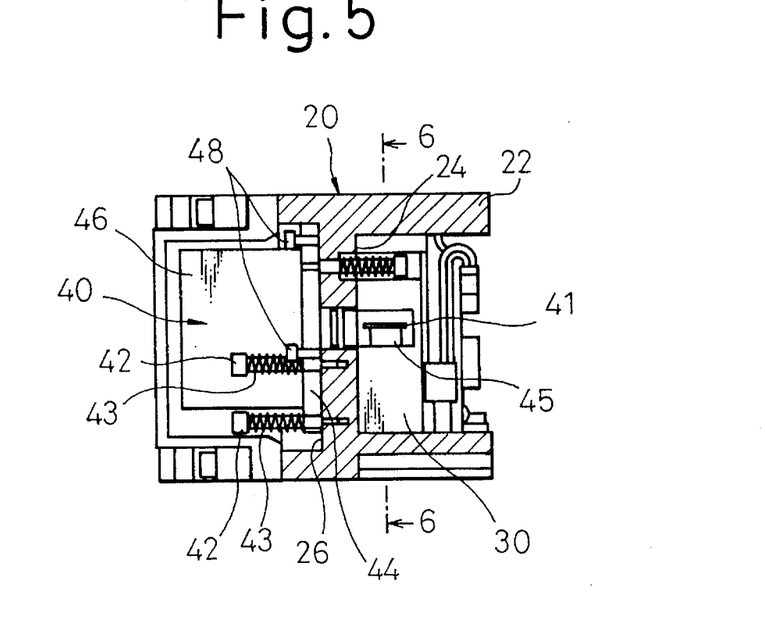
FIG. 5 is a cross-sectional view of the detector, taken along the line 5—5 of FIG. 3.

On the other hand, the laser-beam scanning unit 40 is mounted on the fixture 22 so as to be abutted against a reference face 26, and fixed by different screws 42, described later, in such a manner that the mirror 41 of the laser-beam scanning unit 40 is protruded into the laser-beam projecting unit 30 and is capable of reflecting the detection laser-beam projected by the laser-beam projecting unit 30 in a desired direction to carry out the detection of the welded portion W1 of the workpiece W. The screws 42 for mounting the scanning unit 40 are formed so as to be engaged with threaded holes formed in the fixture 22. As best shown in FIG. 5, since each mounting screw 42 is surrounded by a compression spring 43 arranged between the screw head of the mounting screw 42 and a flange portion 44 formed at the bottom side of the scanning unit 40, the scanning unit 40 is pressed against the fixture 22 by the spring force of the compression springs 43.

The movable reflecting mirror 41 is held by a cylindrical mirror holder 45 arranged so as to be rotated together with the movable mirror 41 by the galvanometer 46. Namely, the movable reflecting mirror 41 is moved through a predetermined angle about an axis of rotation thereof by the galvanometer 46. Thus, the movable reflecting mirror 41 can reflect the detection laser-beam toward a desired destination, i.e., the surface of the workpiece W, and also scans the laser-beam across the weld portions W1 of the workpiece W.

Figure 6:
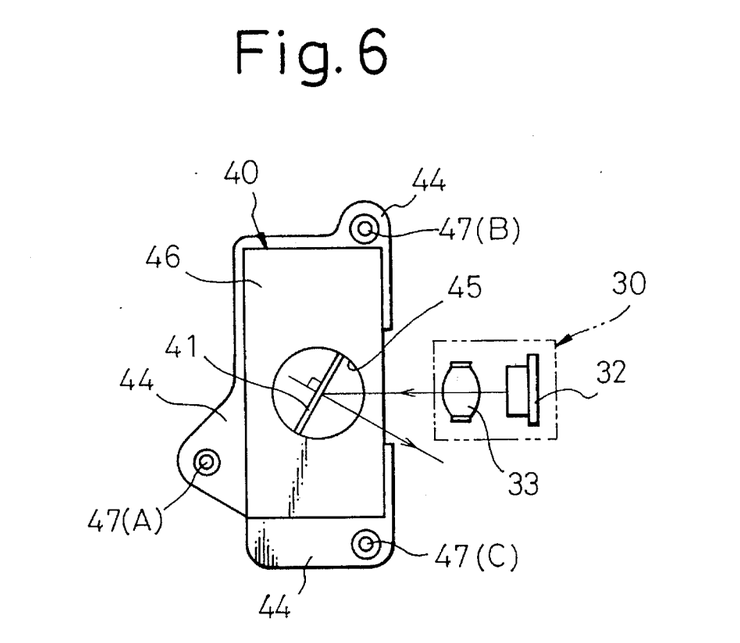
FIG. 6 is a front view of the independent scanning unit viewed from the line 6—6 of FIG. 5, illustrating a relationship between an optical axis adjusting means, provided on the scanning unit, and the detection laser beam used with the weld-position detector according to the present invention.

As described above, the scanning unit 40 is fixedly mounted on the fixture 22 under the pressure of the compression springs 43. Additionally, the flange portion 44 of the scanning unit 40 is formed with three threaded holes 47 arranged so as to be spaced apart from one another as best shown in FIG. 6, and three adjusting screws 48 are engaged in these three threaded holes 47 until foremost points of the adjusting screws 48 rest on the reference face 26 of the fixture 22 of the weld-position detector 20 (see FIG. 5). Thus, when the three adjusting screws 48 are adjustably screwed in or screwed out by an operator, the scanning unit 40 can be easily moved so as to finely change its position and posture against the fixture 22, and accordingly, the position and posture of the rotary reflecting mirror can be adjustably changed so as to adjust the scanning plane of the detection laser-beam.

More specifically, when the adjusting screws 48 are engaged in three threaded holes 47(A), 47(B), and 47(C) as shown in FIG. 6, respectively, until the foremost points of respective screws 48 rest on the reference surface 26 of the fixture 22, and when one of the adjusting male-screws 48, e.g., the screw 48 engaged in the threaded hole 47(C) is adjustably screwed in or out, the scanning unit 40 is adjustably tilted about an imaginary line extending through the remaining two threaded holes 47(A) and 47(B) with respect to the reference surface 26 of the fixture 22, and accordingly, the position and posture of the reflecting mirror 41 held by the cylindrical holder 45 can be finely and adjustably changed. Accordingly, it is possible to adjust the scanning plane of the detection laser-beam so that the beam is directed toward a desired destination on the workpiece W. Also, it is possible to bring the scanning plane of the detection laser-beam directed toward the workpiece W into alignment with the plane containing therein an optical axis of a later-described light-receiving lens 52 and an image sensing plane of a later-described line CCD sensor 53 (FIGS. 2, 8A, and 8B) of the light-receiving unit 50. Namely, it should be understood that the adjusting screws 48 and the threaded holes 47 in cooperation with the spring-loaded screws 42 constitute the adjusting means for adjusting one of the three indispensable units, according to the present invention.

It should be noted that the detection laser-beam is projected by the semiconductor laser 32 of the laser-beam projecting unit 30, and is constantly directed toward the rotary reflecting mirror 41.

Figure 2:
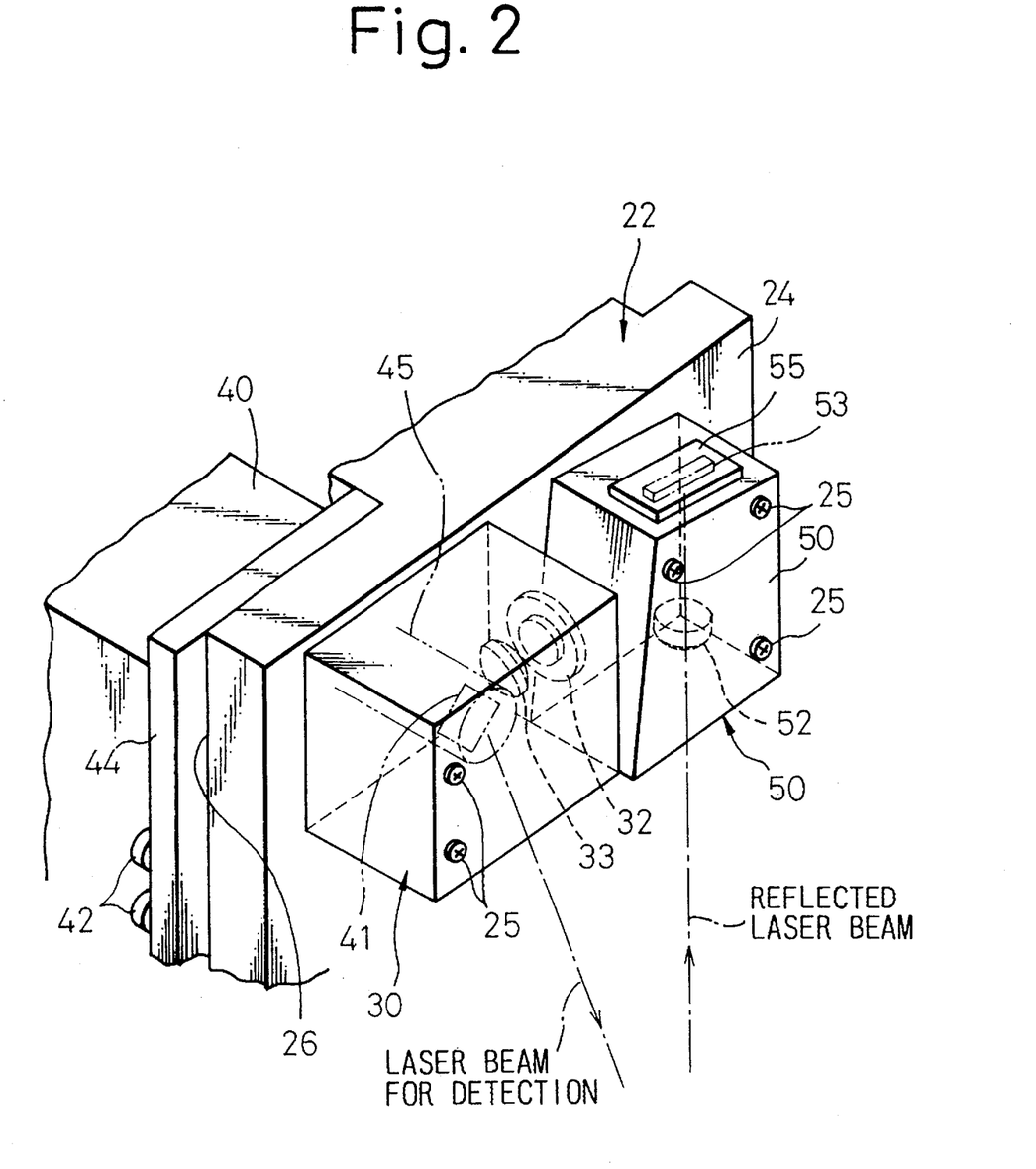
FIG. 2 is a partial perspective view of a weld-position detector provided with an optical axis adjusting means according to a preferred embodiment of the present invention, illustrating independent units mounted at predetermined reference positions on a fixture of the detector.
Figure 3:
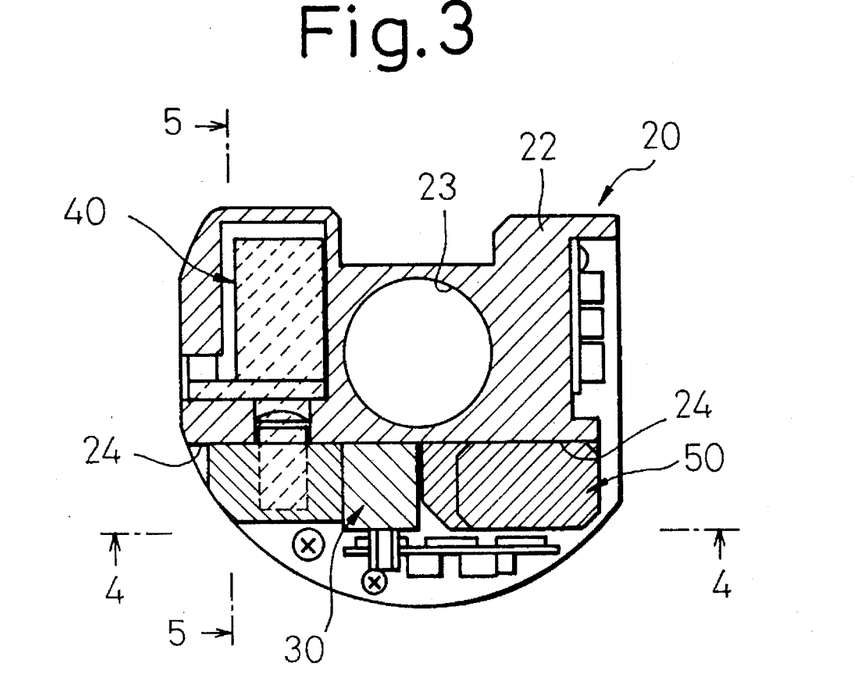
FIG. 3 is a plan view of the weld-position detector according to the present invention, illustrating the arrangement of the components thereof.
Figure 4:
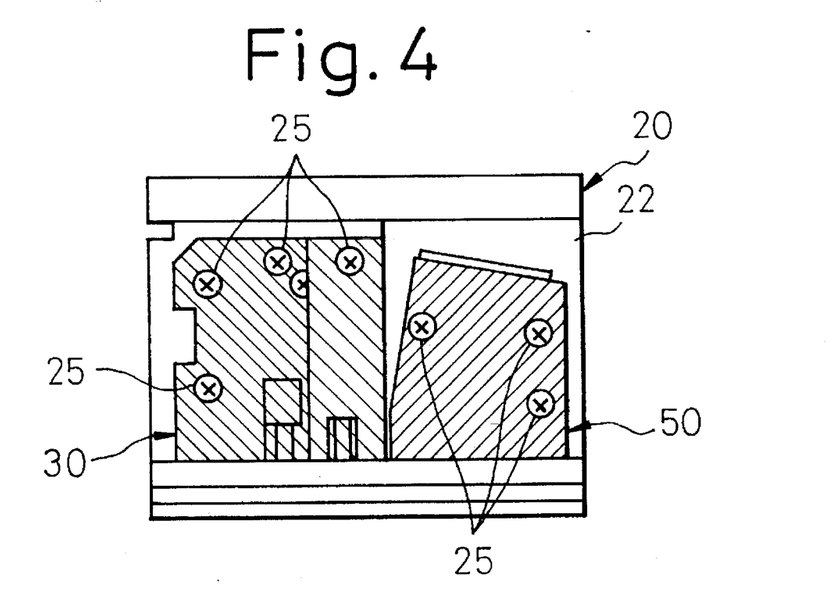
FIG. 4 is a cross-section view of the detector, taken along the line 4—4 of FIG. 3.

At this stage, referring to FIG. 2, the laser-beam projecting unit 30 and the light-receiving unit 50 in the form of independently produced modular units are abutted against the reference face 24 of the fixture 22 and firmly fixed to the fixture 22 by means of mounting screws 25. The scanning unit 40 in the form of another independently produced modular unit is abutted against and mounted on the reference surface 26 of the fixture 22 as described hereinbefore.

Figure 7A:
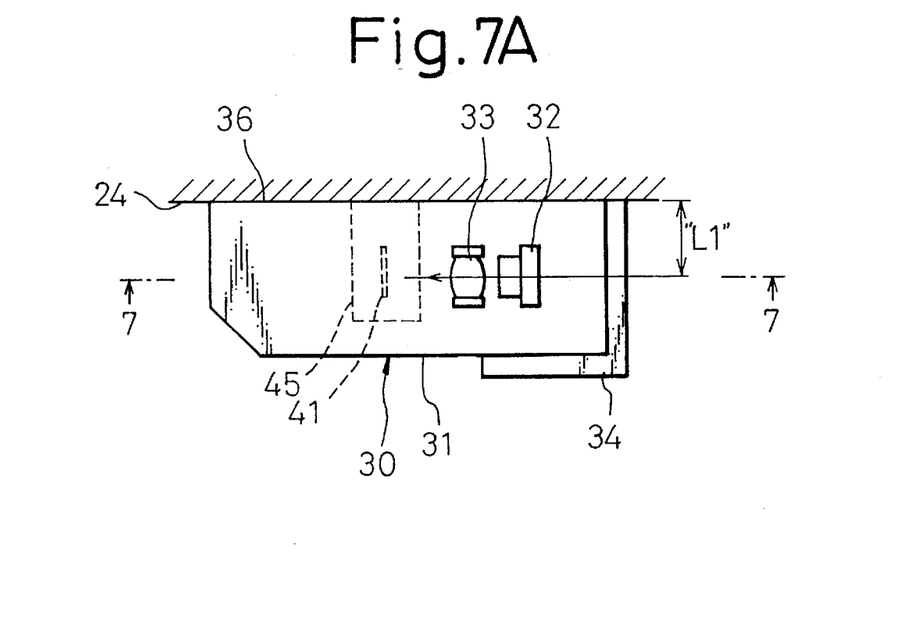
FIG. 7A is a plan view of the independent laser-beam projecting unit mounted on a reference face provided on the fixture of the weld-position detector according to the present invention.
Figure 7B:
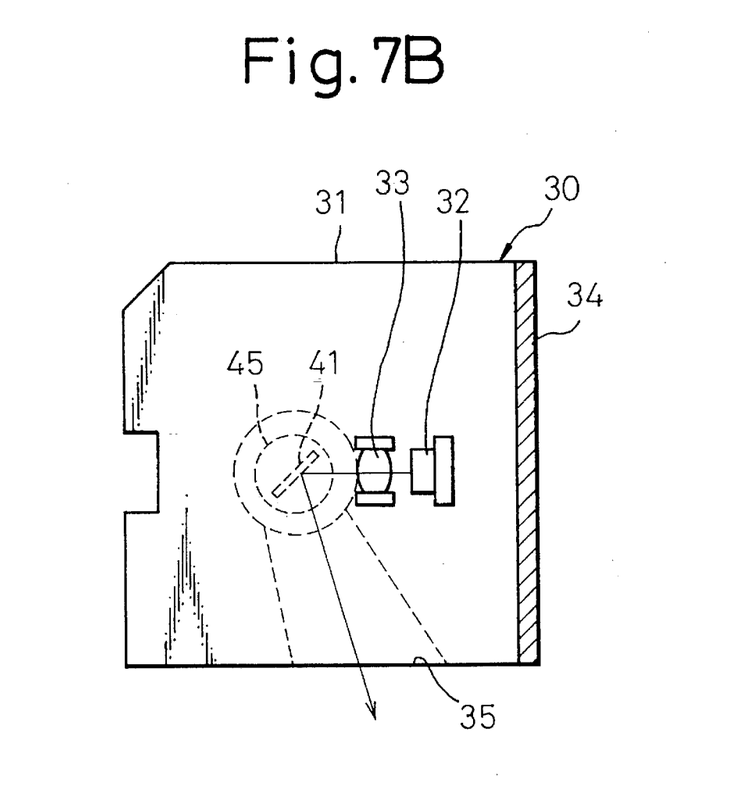
FIG. 7B is a side view of the laser-beam projecting unit, viewing from the line 7—7 of FIG. 7A.

Referring now to FIGS. 7A and 7B, the laser-beam projecting unit 30 in the form of an independently produced modular unit is provided with a housing 31 in which the above-mentioned semiconductor laser 32 for producing the detection laser-beam and the lens 33 for collecting and projecting the detection laser-beam are mounted at predetermined positions, respectively, by a non-illustrated bracket means. The housing 31 is attached to the reference surface 24 of the fixture 22 at a reference face 36 thereof, and is provided with an opening 35 through which the detection laser-beam reflecting from the rotary reflecting mirror 41 shines on the workpiece W (FIG. 1), and a part of the unit 30 is covered with a covering 34. A distance "L1" between the reference face 36 of the unit 30 and the optical axis of the detection laser-beam produced by the semiconductor laser 32 is predesigned and adjusted during the production of the laser-beam projecting unit 30.

Figure 8A:
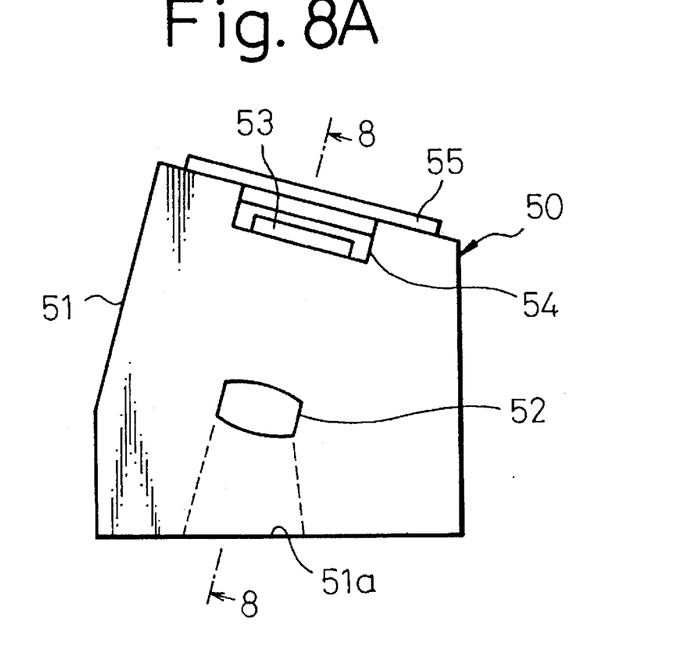
FIG. 8A is a schematic side view of the independent light-receiving unit incorporated in the weld-position detector according to the present invention.
Figure 8B:
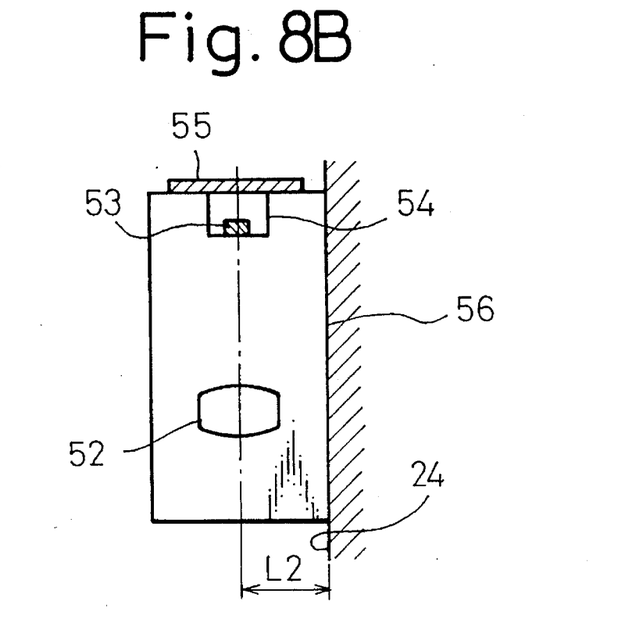
FIG. 8B is a schematic cross-sectional view of the light-receiving unit, taken along the line 8—8 of FIG. 8A.

Referring to FIGS. 8A and 8B, the light-receiving unit 50 in the form of an independently produced modular unit for receiving the detection laser-beam after it is reflected from the workpiece W is provided with a housing 51 in which a light-receiving lens 52 is held by an appropriate lens-holding bracket (not shown). The housing 51 also holds therein a line CCD sensor 53 so as to detect the detection laser-beam entering the light-receiving unit 50 after being reflected from the workpiece W and passing through the light-receiving lens 52.

The charge-coupled image sensor (the line CCD sensor) 53 is held by a holder 54, and is electrically connected to electric components mounted on a printed-circuit board 55 which is fixed to the outer surface of the light-receiving unit 50. The housing 51 of the light-receiving unit 50 is provided, at a bottom portion thereof, with an opening 51a through which the detection laser-beam reflected from the surface of the workpiece W, is permitted to enter the unit 50 and to reach the charge-coupled image sensor 53 via the lens 52.

The housing 51 of the light-receiving unit 50 is provided with a reference face 56 as best shown in FIG. 8B, by which the unit 50 is abutted against the reference face 24 of the fixture 22. A distance "L2" between the reference face 56 and the optical axis of the lens 52 and the image sensor 53 is predesigned and adjusted during the independent production stage of the unit 50.

From the foregoing, it will be understood that according to the present invention, the three indispensable components of a weld-position detector for an automatic welding machine such as a robot welding machine or a multi-articulated welding robot are independently produced beforehand so as to incorporate therein various electric and optical elements in a predesigned manner, and are mounted on a predetermined fixture in the weld-position detector at respective predetermined mounting positions. Therefore, when the three independent units are mounted on the reference faces of the fixture of the weld-position detector, the electric and optical elements of the three indispensable units are automatically arranged and positioned at appropriate positions suitable for performing the weld-position detecting operation. The fine adjustment of the optical axis of the detection laser-bee can be easily achieved by adjusting the mounting position of only one of the three indispensable and independently produced units with respect to the fixture by using an adjusting means which includes adjusting screws 48 engaged in the threaded holes 47 formed in the unit.

It should be appreciated that the adjustment of the optical axis of the detection laser-beam may be accomplished by adjusting the position and posture of either the laser-beam projecting unit 30 or the light-receiving unit 50 rather than the scanning unit 30 by employing an adjusting means similar to the described adjusting means which includes the adjusting screws 48 and the threaded holes 47. However, since only the scanning unit 30 among the three independent units 30, 40, and 50 has therein movable optical and electric elements, i.e., the movable reflecting mirror 41 driven by the galvanometer, the adjustment of the position and posture of the scanning unit 40 is most appropriate.

It should further be understood that, according to the present invention, the fine and accurate adjustment of the optical axis of the detection laser-beam of the weld-position detector used with the robot welding machine can be easily achieved by an operator without help of any special tools, when producing and assembling the weld-position detector or when using the detector. Therefore, the production and the maintenance of the weld-position detector can be simplified resulting in reducing the manufacturing cost of the weld-position detector. In addition, an increase in the accuracy of the operation of the detector can be obtained.

What is claimed is:

1. A weld-position detector, for detecting weld portions of a workpiece to be welded by an automatic welding machine, comprising:

a laser-beam projecting means including a laser source and a projecting lens, said projecting lens projecting a detection laser-beam from said laser source in a fixed direction;

a scanning means including a movable reflecting mirror and a galvanometer, said galvanometer moving said reflecting mirror so as to direct the detection laser-beam coming from said laser-beam projecting means along said fixed direction toward the weld portions of the workpiece and to scan the detection laser-beam across the weld portions of the workpiece upon being projected by the laser-beam projecting means; and a light-receiving means including a light-receiving lens and a light sensor, said light-receiving means receiving the detection laser-beam reflected from the weld portions of the workpiece to therein permit the light sensor to detect the detection laser-beam, wherein said laser-beam projecting means, scanning means, and light-receiving means are beforehand produced as single independent units; and a fixture for accurately mounting, at predetermined positions thereof, said respective three independent units, said fixture having a first reference face to which said laser-beam projecting means and said light-receiving means are commonly and fixedly attached, and a second reference face thereof to which said scanning means provided with an optical axis adjusting means is adjustably attached, said first and second reference faces of said fixture being opposite faces formed in a plate member, wherein said optical axis adjusting means adjusts position and posture of said scanning means with respect to the predetermined position thereof to therein allow alignment of the optical axis of the detection laser-beam projected by said laser-beam projecting means with a predetermined axis lying in a predetermined plane of said light-receiving means.

2. A weld-position detector according to claim 1, wherein said scanning means mounted at said predetermined position on said second reference face of said fixture comprises spring-loaded mounting screw means for fixing said scanning means to said predetermined position on said second reference face of said fixture while applying a spring force to said scanning means so that said scanning means is pressed against said fixture, said scanning means being formed with three threaded holes arranged apart from one another; and wherein said optical axis adjusting means comprises three adjusting screws capable of being engaged in said three threaded holes of said scanning means and having foremost points capable of abutting against said second reference face of said fixture, said three adjusting screws being screwed in and out so as to change the position and posture of said scanning means with respect to said second reference face of said fixture in cooperation with said spring-loaded mounting screw means.

3. A weld-position detector according to claim 1, wherein said fixture comprises means for mounting said weld-position detector on said automatic welding machine.

4. A weld-position detector according to claim 1, wherein a movable reflecting mirror, of said scanning means attached to said second reference face of said fixture, protrudes into said laser-beam projecting means attached to said first reference face of said fixture at a position adjacent to said projecting lens thereof.

* * * * *